Feb. 26, 1963    R. E. FREEMANTLE    3,079,123
SEATING ARRANGEMENT FOR BUTTERFLY VALVES
Filed May 23, 1961    2 Sheets-Sheet 1

INVENTOR.
ROBERT E. FREEMANTLE
BY
Raymond A. Paquin
ATTORNEY.

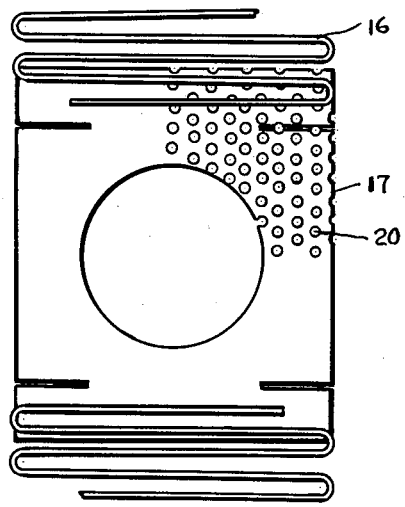
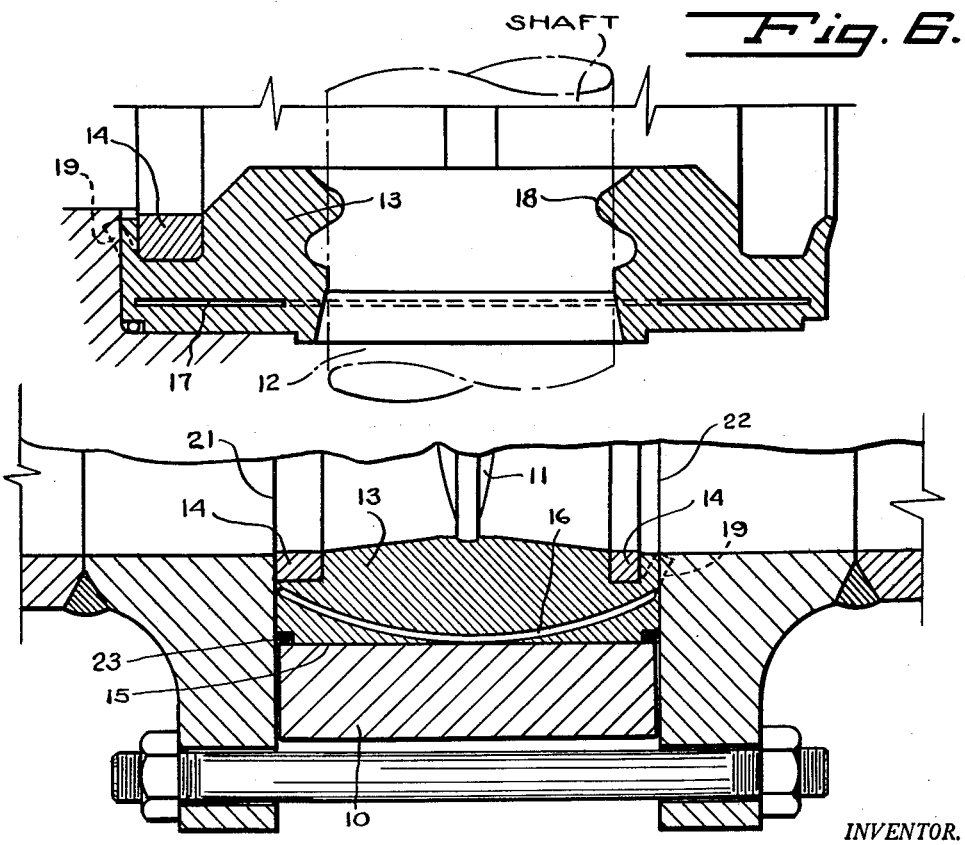

United States Patent Office 3,079,123
Patented Feb. 26, 1963

3,079,123
SEATING ARRANGEMENT FOR
BUTTERFLY VALVES
Robert Edward Freemantle, Baie d'Urfe, Quebec, Canada, assignor to Dominion Engineering Works Limited
Filed May 23, 1961, Ser. No. 112,043
13 Claims. (Cl. 251—306)

This invention relates to pivot valves of the type generally known as butterfly valves. It is more particularly related to the seat construction of butterfly valves incorporating a circular disk and an annular seat member of resilient material such as rubber.

For minimum resistance to flow through the valve, it is customary to dimension the internal diameter of the seat member so as to match the bore of the valve. The seat member is therefore contained in an annular groove formed in the wall of the valve bore. For proper functioning of the valve, and for satisfactory life of the seat member, it is important that once the seat member has been installed in its housing groove, it should not change its shape due to differential fluid pressure.

In contemporary constructions the seat member is retained in its annular groove by mechanical application of radially outward pressure near to its axial extremities.

Since the inner periphery of the seat member mid-way of its axial length forms the resilient annulus of sealing contact with the perimeter of the valve disk in its "closed" position, it is not practical to apply radially outward mechanical pressure to this zone of the seat member other than that applied by the closed valve disk.

With such constructions, when the valve disk is partially or fully open there is a tendency for the seat member to lose contact with the bottom of its containing groove, mid-way of its axial length, and to bulge radially inwards. To offset this tendency, the seat member may be cemented into its containing groove, but disadvantages of this are the cost of the cementing operation and the difficulty of removing the seat member when replacement becomes necessary.

Unless the design of the valve is made intolerably elaborate, it is not possible to install a resilient seat member having rigid internal reinforcement.

Butterfly valves incorporating seat members made in accordance with this invention are of lower first cost than comparable valves on the market, and seat changing may be carried out more quickly and more easily than with known contemporary valves of this type.

The principal object of this invention is to provide an improved valve seat arrangement incorporating simplified seat removal and replacement.

Another object is to provide a valve seating arrangement which presents minimum resistance to flow through the valve.

Another object is to provide a valve seat member, that once installed in its annular groove, will not change its shape due to differential fluid pressure.

Another object is to provide a seal, integral to the seat member, in the bores for the valve disc shaft which will eliminate expensive shaft gland packings.

Another object of the invention is to provide a butterfly valve incorporating a seat member which is relatively simple and economical in construction and wherein seat changing may be carried out more quickly and more easily than with prior valves of this type.

Another object is to provide a butterfly valve of the type set forth which requires little or no machining.

Other objects and advantages of the invention will be apparent from the following description taken in connection with the accompanying drawings wherein the preferred form of the invention has been given by way of illustration only.

In contemporary butterfly valve constructions, to maintain the shape of the seat member, it is common practice to retain the seat member in its annular groove by means of adhesives and/or by the mechanical application of radial pressure, near to its axial extremities. This radial pressure is applied by means of retaining segments which are individually screwed to the valve casing and together form a ring to clamp the seat member in position.

One disadvantage in using retaining segments, lies in the excessive labour time required to install and also replace the seat member, due to each retaining segment being screwed into position and requiring individual handling. Also, the holes for the screws have to be drilled and tapped radially into the valve casing.

Again, with such constructions, when the valve disc is partially or fully open, there is a tendency for the seat member to lose contact with the bottom of its retaining groove, mid-way of its axial length and to bulge radially inwards.

If adhesives are used to offset this tendency, extra cost is incurred in the initial installation of the seat member and also when replacement becomes necessary, for the old adhesive has to be scraped out of the groove and new adhesive applied.

I have now invented a valve seat member, made from a resilient material, such as rubber, incorporating a reinforcing insert which does not resist out-of-round elastic deformation (for assembly of the seat member into its containing groove) but which is structurally resistant to deformation in radial planes containing the axis of the valve bore. This insert prevents radial inward bulging of the installed seat member mid-way of its axial length due to differential fluid pressure. Installation of this seat member does not entail the use of adhesives or screwed fastenings.

An important and exclusive feature of this invention is the cambered annular reinforcing insert which is molded into the resilient seat member. The camber of the insert, as seen in a radial plane section containing the axis of the valve bore, is such that its concave side is presented to the axis of the bore.

The chord of the camber is approximately equal to the width of the seat-containing groove in the valve housing, so that the seat member is a snug fit axially in the groove. The external periphery of the seat member, after installation, is a snug fit in the bottom of the groove.

Following installation of the seat member into its containing groove, two relatively narrow retaining rings exert radially outward pressure on the seat member near its axial extremities.

Due to the cambered form of the insert, radially outward forces near its axial extremities effectively induce three-line crowding of the seat member into its containing groove; a line of radial pressure contact is developed between the periphery of the seat member and the bottom of its containing groove and two lines of axially-opposed pressure contact are developed between the end faces of the seat member and the side walls of the groove. The cambered insert is braced outwardly against three unyielding wall abutments and therefore resists forces tending to bulge the seat member radially inwards; thus the seat member is effectively tightened in its containing groove both radially and axially, to prevent leakage of fluid between its periphery and the valve housing.

Referring to the drawings:
FIG. 1 is a partial section through a valve assembly embodying this invention.
FIG. 2 is a section on 2—2 of FIG. 1.

FIG. 5 shows a detail of the reinforcing plate and cambered insert assembly, as shown at 5—5 in FIG. 4.

FIG. 6 is an enlarged cross section, similar to FIG. 4 and

FIG. 7 is similar to FIG. 3, and shows an alternative construction of the valve assembly, and an alternative arrangement of the retaining rings.

Referring more particularly to the drawings wherein similar reference characters designate corresponding parts throughout:

Figure 1:
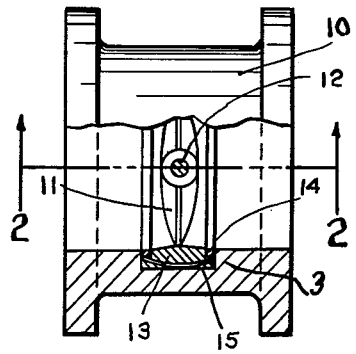

Referring to FIG. 1, seat member 13 is positioned in groove 15 of valve housing 10, and secured in groove 15 by retaining rings 14. Valve disc 11 is rotatably mounted in valve housing 10 by shaft 12, the periphery of valve disc 11 being a fluid sealing interference fit in valve seat member 13, when in the position shown in FIG. 1.

Figure 2:
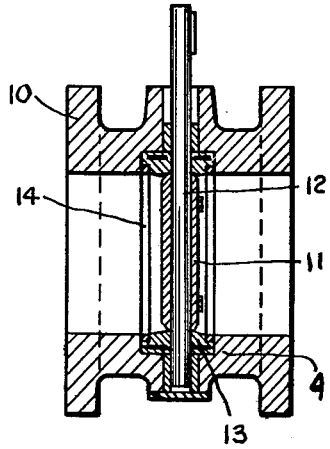

FIG. 2 shows a section through the valve assembly taken along the center line of the shaft 12. This figure shows how shaft 12 passes through the seat member 13 in two places.

Figure 3:
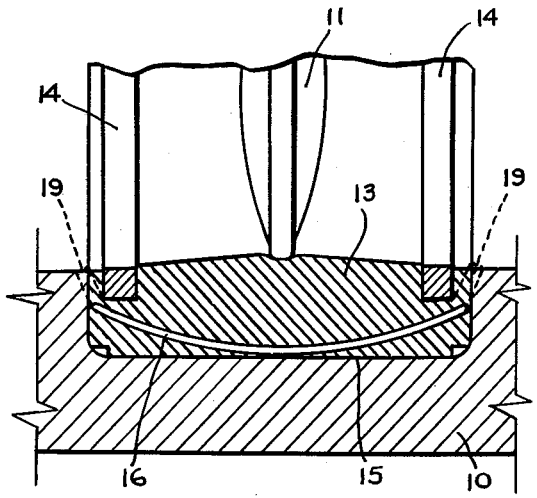
FIG. 3 is an enlarged view of the detail shown generally at 3 in FIG. 1.

FIG. 3 is an enlarged view of the detail shown generally at 3 in FIG. 1, and shows a typical section through the valve seat member and reinforcing insert. Also shown in FIG. 3 are the butt ended retaining rings 14, and the groove sealing lip 19.

Figure 4:
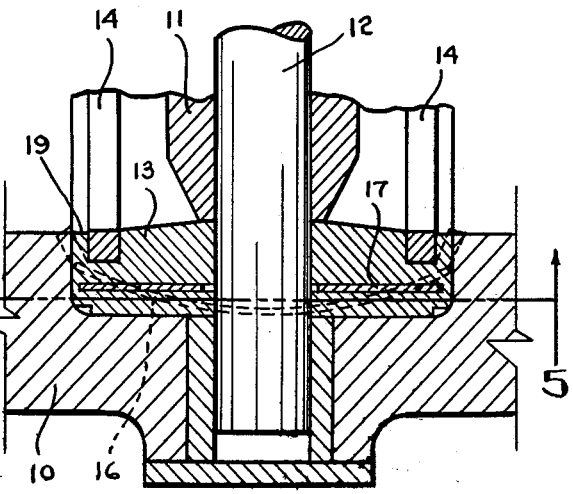
FIG. 4 is an enlarged view of the detail shown generally at 4 in FIG. 2.

FIG. 4 is an enlarged view of the detail shown generally at 4 in FIG. 2, showing specifically one of the reinforcing plates 17, local to one of the bores in the seat member 13, through which the valve disc shaft 12 passes.

FIG. 5 is a detail of the cambered insert assembly showing one reinforcing plate 17, welded to the ends of reinforcing wire 16. Reinforcing plate 17 is a flat plate perforated by holes 20, to enable the resilient valve seat material, such as rubber, to infiltrate through and form a complete bond to the plate.

FIG. 6 is an enlarged cross section, similar to FIG. 4, through the valve seat member 13, local to one of the bores for shaft 12, showing the bore contour and detailing the ribs 18, which provide an interference fit on shaft 12. These ribs 18 form an effective seal on shaft 12 and eliminate the need for shaft gland packings.

FIG. 7 shows an alternative arangement of the valve assembly, wherein the side walls of groove 15 are formed by faces 21 and 22 of the communicating pipe flanges, the valve seat member 13 being sandwiched in between. Also shown is an alternative execution of retaining ring 14, shown without the groove sealing lip 19, and with an O-ring 23 located in the corner of seat member 13.

Butterfly valves incorporating seat members made in accordance with this invention, are of lower first cost than comparable valves on the market, and seat changing may be carried out more quickly and more easily than with known contemporary valves of this type.

Also contributing to lower first cost, is the fact that valve housings made in accordance with this invention require little or no machining. Necessary machining, at the most, will amount to merely facing the seat groove.

It will be noted from the drawings that two executions of the valve of the present invention are shown as follows:

In FIGS. 1 through 6 there is shown a wide-bodied valve, with retaining snap rings to secure the seat member in the groove.

In FIG. 7 there is shown a narrow-bodied valve, with no groove and utilizing the mating flanges of the adjoining pipe sections, to act as the groove side walls.

The reinforcing insert may also take many forms. In the execution disclosed, the reinforcing insert is formed from wire, with welded perforated plates local to the shaft opening positions.

The reinforcing insert may also be metal stamping with lanced or stamped fingers.

From the foregoing it will be seen that I have provided new and improved means for obtaining all of the objects and advantages of the invention.

I claim:

1. In a pivot valve having a valve body, a resilient seat member having a cambered reinforcing member characterized by stiffness in radial planes containing the axis of the valve body and flexibility in the plane transverse to the axis of the valve body and rigid retaining rings in planes normal to the axis of said valve body and flush with the inner periphery of said seat member near to its axial extremities and exerting radially outward pressure on said resilient seat member.

2. In a pivot valve having a valve body, a resilient seat member having a cambered reinforcing member characterized by stiffness in radial planes containing the axis of the valve body and flexibility in the plane transverse to the axis of the valve body and rigid retaining rings in planes normal to the axis of said valve body and flush with the inner periphery of said seat member near to its axial extremities and exerting radially outward pressure on said resilient seat member near its axial extremities.

3. In a pivot valve having a valve body, a resilient seat member having a cambered reinforcing member characterized by stiffness in radial planes containing the axis of the valve body and flexibility in the plane transverse to the axis of the valve body and rigid retaining rings in planes normal to the axis of said valve body and flush with the inner periphery of said seat member near to its axial extremities and exerting radially outward pressure on said resilient seat member, one of said retaining rings being provided on each side of the axis of the valve member.

4. In a pivot valve having a valve body, a resilient seat member having a cambered reinforcing member characterized by stiffness in radial planes containing the axis of the valve body and flexibility in the plane transverse to the axis of the valve body and rigid retaining rings in planes normal to the axis of said valve body and flush with the inner periphery of said seat member near to its axial extremities and exerting radially outward pressure on said resilient seat member, said reinforcing member comprising a flexible member.

5. In a pivot valve having a valve body, a resilient seat member having a cambered reinforcing member characterized by stiffness in radial planes containing the axis of the valve body and flexibility in the plane transverse to the axis of the valve body and rigid retaining rings in planes normal to the axis of said valve body and flush with the inner periphery of said seat member near to its axial extremities and exerting radially outward pressure on said resilient seat member, said reinforcing member being formed of a bent wire means.

6. In a pivot valve having a valve body, a resilient seat member having a cambered reinforcing insert characterized by stiffness in radial planes containing the axis of the valve body and flexibility in the plane transverse to the axis of the valve body and rigid retaining rings in planes normal to the axis of said valve body and flush with the inner periphery of said seat member near to its axial extremities and exerting radially outward pressure on said resilient seat member.

7. In a pivot valve having a valve body, a resilient seat member having a cambered reinforcing insert characterized by stiffness in radial planes containing the axis of the valve body and flexibility in the plane transverse to the axis of the valve body and rigid retaining rings in planes normal to the axis of said valve body and flush with the inner periphery of said seat member near to its axial extremities and exerting radially outward pressure on said resilient seat member, said reinforcing insert comprising a flexible member.

8. In a pivot valve having a valve body, a resilient seat member having a cambered reinforcing member characterized by stiffness in radial planes containing the axis of the valve body and flexibility in the plane transverse to the axis of the valve body and rigid retaining rings in planes normal to the axis of said valve body and flush with the inner periphery of said seat member near to its axial extremities and exerting radially outward pressure on said resilient seat member, the portions of said reinforcing member surrounding the ends of the pivot shaft being relatively inflexible.

9. In a pivot valve having a valve body, a resilient seat member having a cambered reinforcing insert characterized by stiffness in radial planes containing the axis of the valve body and flexibility in the plane transverse to the axis of the valve body and rigid retaining rings in planes normal to the axis of said valve body and flush with the inner periphery of said seat member near to its axial extremities and exerting radially outward pressure on said resilient seat member, the portions of said insert surrounding the ends of the pivot shaft being relatively inflexible.

10. In a pivot valve having a valve body, a resilient seat member having a cambered reinforcing member characterized by stiffness in radial planes containing the axis of the valve body and flexibility in the plane transverse to the axis of the valve body and rigid retaining rings in a groove in said seat member at the inner periphery of said seat member and imparting a radially outward force to the inner periphery of said resilient seat member near to its axial extremities and making a firm axial abutting contact between the end faces of said seat member and the side walls of its containing groove in said valve body and at the same time making firm abutting contact of the external periphery of said seat member against the bottom of the containing groove in the median transverse plane of the valve body thereby preventing leakage between the seat member and said body.

11. In a pivot valve having a valve body, a resilient seat member having a cambered reinforcing insert characterized by stiffness in radial planes containing the axis of the valve body and flexibility in the plane transverse to the axis of the valve body and rigid retaining rings in a groove in said seat member at the inner periphery of said seat member and imparting a radially outward force to the inner periphery of said resilient seat member near to its axial extremities and making a firm axial abutting contact between the end faces of said seat member and the side walls of its containing groove in said valve body and at the same time making firm abutting contact of the external periphery of said seat member against the bottom of the containing groove in the median transverse plane of the valve body thereby preventing leakage between the seat member and said body.

12. In a pivot valve having a valve body, a resilient seat member having a cambered reinforcing member characterized by stiffness in radial planes containing the axis of the valve body and flexibility in the plane transverse to the axis of the valve body and rigid retaining rings in a groove in said seat member at the inner periphery of said seat member and imparting a radially outward force to the inner periphery of said resilient seat member near to its axial extremities and making a firm axial abutting contact between the end faces of said seat member and the side walls of its containing groove in said valve body and at the same time making firm abutting contact of the external periphery of said seat member against the bottom of the containing groove in the median transverse plane of the valve body thereby preventing leakage between the seat member and said body, the portions of said member surrounding the ends of the pivot shaft being relatively inflexible.

13. In a pivot valve having a valve body, a resilient seat member having a cambered reinforcing insert characterized by stiffness in radial planes containing the axis of the valve body and flexibility in the plane transverse to the axis of the valve body and rigid retaining rings in a groove in said seat member at the inner periphery of said seat member and imparting a radially outward force to the inner periphery of said resilient seat member near to its axial extremities and making a firm axial abutting contact between the end faces of said seat member and the side walls of its containing groove in said valve body and at the same time making firm abutting contact of the external periphery of said seat member against the bottom of the containing groove in the median transverse plane of the valve body thereby preventing leakage between the seat member and said body, the portions of said insert surrounding the ends of the pivot shaft being relatively inflexible.

References Cited in the file of this patent

UNITED STATES PATENTS

| 1,977,351 | Phillips | Oct. 16, 1934 |
| 2,809,060 | Thompson | Oct. 8, 1957 |
| 2,923,524 | Fawkes | Feb. 2, 1960 |
| 2,936,153 | Gaffin | May 10, 1960 |
| 2,991,043 | Saar | July 4, 1961 |

FOREIGN PATENTS

| 213,184 | Australia | Feb. 25, 1958 |
| 1,130,544 | France | Oct. 1, 1956 |